United States Patent
Citerin et al.

(10) Patent No.: US 9,338,571 B2
(45) Date of Patent: May 10, 2016

(54) METHOD FOR DETERMINING A DIRECTION OF AT LEAST ONE SOUND SOURCE FROM AN ARRAY OF MICROPHONES

(71) Applicant: CANON KABUSHIKI KAISHA, Tokyo (JP)

(72) Inventors: Johann Citerin, Cesson-Sevigne (FR); Gérald Kergourlay, Chevaigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 14/278,533

(22) Filed: May 15, 2014

(65) Prior Publication Data

US 2015/0289075 A1    Oct. 8, 2015

(30) Foreign Application Priority Data

May 17, 2013  (GB) .................................. 1308939.6

(51) Int. Cl.
  H04R 3/00      (2006.01)
  H04R 29/00     (2006.01)
  G01S 3/802     (2006.01)
  G01S 3/808     (2006.01)

(52) U.S. Cl.
  CPC .............. *H04R 29/005* (2013.01); *G01S 3/802* (2013.01); *G01S 3/8083* (2013.01)

(58) Field of Classification Search
  None
  See application file for complete search history.

(56) References Cited

U.S. PATENT DOCUMENTS

| 2003/0142210 | A1  | 7/2003  | Carlbom et al. |
| 2009/0110225 | A1* | 4/2009  | Kim .............................. 381/356 |
| 2010/0217590 | A1  | 8/2010  | Nemer et al. |
| 2011/0222707 | A1* | 9/2011  | Hwang et al. .................. 381/92 |
| 2012/0308038 | A1* | 12/2012 | Shuang et al. .................. 381/92 |

FOREIGN PATENT DOCUMENTS

| EP | 2202531 A1    | 6/2010 |
| WO | 2008/065197 A1 | 6/2008 |
| WO | 2013/041942 A1 | 3/2013 |

* cited by examiner

*Primary Examiner* — Regina N Holder
(74) *Attorney, Agent, or Firm* — Canon USA Inc. IP Division

(57) ABSTRACT

A direction of at least one sound source from an array of microphones is determined by obtaining a plurality of solutions sets from audio signals acquired from the microphones array, each solutions set being obtained by applying a sound source localization method to the audio signals, each solution defining a sound direction candidate. Then, solutions are grouped into groups of solutions and at least one of the groups is removed, based on a criterion of disparity between the solutions sets. The direction of the at least one sound source from directions associated with the remaining groups is obtained.

28 Claims, 9 Drawing Sheets

METHOD FOR DETERMINING A DIRECTION OF AT LEAST ONE SOUND SOURCE FROM AN ARRAY OF MICROPHONES

This application claims the benefit under 35 U.S.C. §119 (a)-(d) of United Kingdom Patent Application No. 1308939.6, filed on May 17, 2013 and entitled "METHOD FOR DETERMINING A DIRECTION OF AT LEAST ONE SOUND SOURCE FROM AN ARRAY OF MICROPHONES". The above cited patent application is incorporated herein by reference in its entirety.

FIELD OF THE INVENTION

The present invention relates in general to source sound localization, and more particularly to a method and a device for determining a direction of at least one sound source from an array of microphones.

BACKGROUND OF THE INVENTION

Systems exist that detect the direction of sound sources (sound source localization or SSL). Until recently, these systems were very specific and of large size due to expansive and huge hardware. As a consequence, they were only dedicated to military applications (sonars).

Thanks to the development of modern computation power and hardware, SSL is now an emerging technology with a growing number of more general civilian applications, such as surveillance, video-conferencing, mobile phones, video games, robotics, etc.

As shown in FIG. 1, the physical principle of SSL is based on arrays of more than two microphones, which enable to obtain signals depending on the sources direction.

Early detection techniques were based on simple methods like triangulation. However, they were only usable with a single sound source, with large microphones arrays, and at high frequencies (only applicable to sonars).

More recent applications use much more sophisticated signal processing methods that are able to localize the source direction by using complex algorithms based on the differences of delay and amplitude between the microphone signals shown in FIG. 1. A source direction (also known as direction of arrival, DOA, of sound) from an array of microphones is generally expressed using two angles ($\theta$; $\phi$) of an angular space, where $\theta$ is the azimuth, i.e. the angle with the frontal plane, and $\phi$ is the elevation angle.

In particular, SSL algorithms rely on two main kinds of SSL methods: beamforming method requiring large microphones arrays and angular-spectra method complying with the use of small-sized microphones arrays.

Well-known angular-spectra methods are MUSIC, SRP-PHAT and MVDR.

Generally, such an angular-spectra method consists in generating an angular spectrum $m=F(\theta, \phi)$ from audio signals acquired from the array of microphones. In such an angular spectrum, each point ($\theta, \phi$) corresponding to a direction of the space is associated with a respective magnitude m calculated by the method, as shown in FIG. 2.

Local maxima LM (i.e. points whose magnitudes are local maxima) are then identified in the angular spectrum and form a set of possible direction solutions. Part of the possible direction solutions are artifacts or phantom sources (i.e. false solutions).

To remove the artifacts, the possible direction solutions LM are ranked based on their corresponding magnitude m. The best ranked maximum or maxima BM are then identified as true solutions for the real sources RS, as shown in the Figure.

However, in case of noisy environment, of reverberation or of multiple sources, current angular-spectra methods reveal to lack accuracy and/or robustness.

US Patent Application 2010/0217590 is known that discloses a system and method for performing speaker localization. The system uses several SSL algorithms to achieve a better separation between a source and noises of a noisy environment, in case of devices having small microphone arrays, for example mobile phones.

In the method of US 2010/0217590, the algorithm that best suits the environmental conditions is selected and the sound direction solution corresponding to the selected algorithm is finally output as the direction of the source.

This method has several drawbacks.

First, although robustness is slightly improved, accuracy may be not satisfying in some situations where the selected SSL algorithm provides bad localization.

Second, the method is restricted to the localization of a single sound source and thus is inappropriate to the case of multiple sources.

SUMMARY OF THE INVENTION

The present invention has been devised to address one or more of the foregoing concerns, with light of improving accuracy and/or robustness of the sound source localization in case of one or more sound sources.

In this context, according to a first aspect of the invention, there is provided a method of determining a direction of at least one sound source from an array of microphones, comprising:

obtaining a plurality of solutions sets from audio signals acquired from the microphones array, each solutions set being obtained by applying a sound source localization method to the audio signals, each solution defining a sound direction candidate;

grouping the solutions into groups of solutions;

removing at least one of the groups based on a criterion of disparity between the solutions sets; and obtaining the direction of the at least one sound source from directions associated with the remaining groups.

Correspondingly, according to a second aspect of the invention, there is provided a device for determining a direction of at least one sound source from an array of microphones, comprising:

means for obtaining a plurality of solutions sets from audio signals acquired from the microphones array, each solutions set being obtained by applying a sound source localization method to the audio signals, each solution defining a sound direction candidate;

means for grouping the solutions into groups of solutions;

means for removing at least one of the groups based on a criterion of disparity between the solutions sets; and means for obtaining the direction of the at least one sound source from directions associated with the remaining groups.

The present invention increases accuracy and robustness of sound source localization, without requiring additional resources.

This is achieved by grouping solutions from sets obtained from one or several SSL methods at the same time instant or at several time instants into groups and, using disparities between them to remove some of the groups that happen to include only artifacts and not true solutions localizing the real source or sources. A synergy happens between the solutions sets based on the disparities.

Indeed, each SSL method exhibits intrinsic quasi-random fluctuations due to unpredictable events such as uncorrelated noise. That is, it exists a natural disparity among the solutions provided by the SSL method at various time instants. Pure artifacts tend to be more impacted by fluctuations. That is why achieving the synergy between several time instants as providing by embodiments of the invention leads to more robust results than in the prior art.

Furthermore, when applied to the same audio signals, different SSL methods lead to different mistakes or artifacts. A solution that is found to be common to several SSL methods is thus more likely to be a true solution than an artifact. For these reasons, achieving the synergy between different SSL methods as providing by embodiments of the invention leads to more accurate and robust results than in the prior art.

Optional features of the invention are further defined in the dependent appended claims. Where a feature is described in terms of process below, one skilled in the art will be able to implement it as a functional element in the device of the invention.

According to preferred embodiments of the invention, the SSL method is angular-spectra based. It is known that angular-spectra based methods give better results than beamforming methods in case of small size or small number of microphones arrays, which is the case for most of the current emerging applications.

According to preferred embodiments of the invention, the directions of a plurality of sound sources are determined.

According to embodiments of the invention, at least two solutions sets are obtained by applying at least two sound source localization methods at the same time instant.

Thanks to this provision, the localization of one or more sound sources is improved in accuracy and robustness even in environments with noise and reverberation.

In one embodiment, all the solutions sets result from respective different SSL methods. In examples below, three different SSL methods are used to obtain the solutions sets.

According to embodiments of the invention, at least two solutions sets are obtained by applying the same sound source localization method at two or more time instants.

This provision simplifies the process and reduces the resources required in the device since a single SSL method (and thus corresponding software code for example) is needed. It is efficiently implemented in case of noisy or reverberant environments as explained above.

In one embodiment, all the solutions sets result from the same SSL method at respective different time instants.

A combination of these two approaches resulting in several SSL methods at several time instants being used advantageously leads to even better results.

When using several time instants, the method may include performing a removing of solutions from the solutions sets obtained by the same sound localization method based on a criterion of disparity between the solutions sets obtained at the two or more time instants.

Artifacts due to random noise are not stable over time. That is, an artifact is more likely to have a different location on each time frame. Performing a clearing, i.e. removing, based on such disparities over time frames as in the above provision is thus beneficial to increase the accuracy of the SSL.

According to embodiments of the invention, the method comprises comparing the solutions sets to remove a solution from one of the solutions sets when a given number of the other solutions sets do not comprise a solution collocated to the solution to remove, given a predetermined direction margin.

This provision allows to get rid of the solutions which are very likely to be artifacts, before using the disparity between the solutions sets to group and remove solutions.

According to embodiments of the invention, the method comprises removing the solutions having sound direction candidates within a predetermined edge margin of a search space of directions.

For example, a predetermined edge margin of three degrees can be used along the edge of the search space, so that all the directions too close to the edge of the search space of directions will not be considered as sound direction candidates. This is because, due to edge effects, a high number of artifacts are often generated at the edge. Indeed, edge points have lesser neighbours than other points, thus resulting in a greater number of local maxima.

Thanks to the above provision, the number of solutions to be considered for the steps of grouping and removing is reduced. The method is thus more effective.

According to embodiments of the invention, the method comprises removing, from at least one solutions set, the solutions associated with a magnitude smaller than a predetermined value.

That allows to get rid of artifacts due to ambient noise and reverberation before processing the grouping and removing steps.

According to embodiments of the invention, the method comprises, within at least one solutions set, keeping a predetermined number of the solutions associated with magnitudes having the highest magnitudes and removing the other solutions.

For example, only the solutions of each set associated with the ten highest magnitudes are kept.

According to embodiments of the invention, each solution corresponds to a point representing the sound direction candidate in an angular spectrum, and the grouping comprises grouping the solutions that correspond to points belonging to a predetermined area in the angular spectrum.

This provision provides a way to group the solutions requiring low resources since it relies on geometric properties.

The predetermined area can be of any shape, for example a circle or a triangle or a square, centered on a reference point associated with a local maximum of magnitude, or centered on a reference point of a search grid over the angular spectrum. Of course, the reference point may take any position of the predetermined area.

In order to detect all the real sources (no false negative), the predetermined area are preferably chosen large, even if artifacts are likely to be detected too.

In order to detect only real sources (no false positive), the predetermined area are preferably chosen small, even if some real sources may be not detected.

Obviously, intermediate sizes of the predetermined area can be chosen in order to get a compromise between these two situations. The method is thus very versatile and tunable, as the shape can be adjusted.

In a variant, grouping comprises iteratively performing the following steps:
    selecting a solution from the remaining solutions to start a new group; and
    adding to the new group a solution from the other remaining solutions that is close enough to a solution of the new group given a distance criterion, until no other solution of the other remaining solutions meets the distance criterion.

In other words, starting from the solutions, a first solution is selected as a start point to form a new group. The start point may be randomly chosen. Then, any solution that is close enough to a solution already belonging to the group is added to the group. "Close enough" may mean that the two solutions are not farther one from the other than a predefined distance. This step of adding solutions thus creates a chain of close solutions to form the entire new group.

Once all the close solutions for the current group have been found and added to the group, another group is generated in the same way by first selecting a new start point from the remaining solutions (i.e. that are not yet in a group).

In another variant, grouping comprises iteratively performing the following steps:
grouping into sub-groups the solutions that correspond to points belonging to a predetermined area in the angular spectrum, the predetermined area being associated with a reference point of a search angular spectrum grid;
calculating a score for each sub-group, based on magnitudes associated with the solutions composing the sub-group;
keeping aside the sub-group having the highest score; and
removing from the remaining solutions sets, the solutions of the sub-group kept aside, to obtain solutions to be considered for the next iteration;
the groups of solutions resulting from the iterative grouping being the sub-groups kept aside.

The iterative grouping allows very fast computing of the groups. A number of iterations can be predefined. In a variant, the iterations can be stopped as soon as the highest score is less than a threshold. Also in a variant, the iterations can be stopped as soon as a given number of sub-group kept aside is reached.

According to embodiments of the invention, the method further comprises removing any sub-group that does not meet a criterion of disparity between the solutions sets, and the steps of calculating, keeping aside and removing the solutions of the sub-group kept aside are performed on the remaining sub-groups.

According to embodiments of the invention, removing at least one of the groups or sub-groups comprises removing the groups or sub-groups including solutions from less than a predetermined number of solutions sets.

For example, the groups or sub-groups including only solutions obtained from the same solutions set can be removed. In this way, the method is not very selective and so all the sources tend to be detected, even if artifacts are likely to be detected too.

In a variant, the groups including no solution from at least one solutions set are removed, that is, all the groups must have at least one solution from each solutions set. In this way, the method tends to be very selective and so all the detected sources are highly liable to be real sources, but some real sources directions may be lost.

According to embodiments of the invention, the method further comprises calculating a score for each remaining group based on magnitudes associated with the solutions composing the remaining group; the direction of the at least one sound source being the direction associated with the at least one group having the highest score.

This intrinsic (because relying on several solutions sets) score contributes to the synergy between the solutions sets in the process of determining the direction or directions of the at least one sound source.

According to a particular feature, calculating the score of the remaining group or sub-group $G'_k$ comprises calculating a contributing score $W_j(G'_k)$ for each solutions set based on the solutions of that solutions set that compose the remaining group or sub-group $G'_k$.

For example the score is calculated as a sum of scores corresponding to the contribution of each solutions set as follows:

$$W(G'_k) = \sum_{j=1}^{N} W_j(G'_k)$$

where:
$W(G'_k)$ is the score of the remaining group or sub-group $G'_k$;
N is the number of solutions sets j;
$W_j(G'_k)$ is the contributing score of the remaining group or sub-group $G'_k$ corresponding to the contribution of the solutions set j.

Therefore, the score corresponding to the contribution of each solutions set can be calculated in a different way for each solutions set.

For example, the contributing score $W_j(G'_k)$ corresponding to the contribution of each solutions set is calculated as follows:

$$W_j(G'_k) = \frac{\max(m(S_{ji} \in G'_k)) - \min(m)}{\max(m(S_{ji})) - \min(m)}$$

where:
min(m) represents the minimum of a magnitude function m associating directions with respective magnitudes;
$m(S_{ji})$ is the magnitude associated with the $i^{th}$ solution of the solutions set j;
$m(S_{ji} \in G'_k)$ is the magnitude associated with the $i^{th}$ solution of the solutions set j, comprised in the group or sub-group $G'_k$.

In this example, the contributing score for a solutions set depends on the difference between the maximum magnitude of the solutions of that solutions set belonging to $G'_k$ and a minimum magnitude of the whole spectrum.

Thanks to the above example, the respective contributing scores of the solutions sets are comparable. Indeed, such formula allows absorbing differences of rough sizes between the solutions from different solutions sets. That is particularly interesting when such solutions sets have been obtained by applying different SSL methods.

In one particular embodiment, when calculating the score of the remaining group or sub-group, the contributing scores for the solutions sets are weighted using respective weights depending on the corresponding solutions set.

For example, the contributing score corresponding to the contribution of each solutions set is calculated as follows:

$$W_j(G'_k) = \alpha_j = \frac{\max(m(S_{ji} \in G'_k)) - \min(m)}{\max(m(S_{ji})) - \min(m)}$$

where:
$\alpha_j$ is a coefficient depending on the solutions set j;
min(m) represents the minimum of a magnitude function m associating directions with respective magnitudes;

$m(S_{ji})$ is the magnitude associated with the $i^{th}$ solution of the solutions set j;

$m(S_{ji} \in G'_k)$ is the magnitude associated with the $i^{th}$ solution of the solutions set j, comprised in the group or subgroup $G'_k$.

This provision makes it possible to give weight to some SSL methods (i.e. solutions sets) compared to other. In a particular embodiment, the weight or coefficient $\alpha_j$ depends on the sound environmental conditions, for example to favor SSL methods that reveal to be suitable to these environmental conditions.

According to embodiments of the invention, the sound source localization method or methods used to obtain the solutions sets are chosen depending on the sound environmental conditions.

It happens that some SSL methods are more adapted than others to noisy environment, some others are more adapted to reverberant environments, and some others are more robust in multi-speakers cases. Choosing the SSL methods depending on the environment allows a more efficient analysis of the sound sources to be performed and thus a better SSL to be obtained.

The environment-aware selection can be performed by automatic means or by a user.

In another example, the contributing score corresponding to the contribution of each solutions set is calculated as follows:

$$W_j(G'_k) = \frac{\max(m(S_{ji} \in G'_k)) - \min(m)}{\max(m(S_{ji})) - \min(m)} * f(d_j^{max})$$

where:

$m(S_{ji} \in G'_k)$ is the magnitude associated with the $i^{th}$ solution of the solutions set j, comprised in the group or subgroup $G'_k$;

$\min(m)$ represents the minimum of a magnitude function m associating directions with respective magnitudes;

$m(S_{ji})$ is the magnitude associated with the $i^{th}$ solution of the solutions set j;

$f$ is a decreasing function (e.g. $f(x)=\min(1, c/x)$, with c a constant chosen so as to create a suitable weight decrease); and $d_j^{max}$ is a distance, in an angular spectrum, between a point corresponding to the solution $S_{ji}$ verifying max $(m(S_{ji} \in G'_k))$ and a reference point associated with the group or sub-group $G'_k$.

In this example, the contributing score for a solutions set directly depends on the maximum magnitude of the solutions of that solutions set belonging to $G'_k$.

According to embodiments of the invention, a direction associated with a remaining group is calculated as a barycenter of the sound direction candidates of the solutions composing the remaining group.

This provision makes it possible to compute a unique direction associated with each remaining group, instead of having different directions associated with each solution.

Such barycenter may be calculated with weights depending on magnitudes associated with the sound direction candidates.

In a variant, a direction associated with a remaining group is calculated as a barycenter of means of the sound direction candidates for each solutions set composing the remaining group.

That means that a contributing barycenter (e.g. means) is calculated for each solutions set represented in the remaining group, based on the sound direction candidates of that solutions set in the remaining group.

Thanks to that provision, a SSL method is not favored from another one, even if this SSL method leads to a lot more solutions. According to embodiments of the invention, the method comprises applying another sound source localization method to the remaining groups to obtain the direction of the at least one sound source.

The implementation of the method for determining a direction of at least one sound source is thus facilitated as already known SSL methods are used to perform the major part of it.

Another advantage of that embodiment using a "2-step approach" (i.e. one step applying at least one SSL method at at least one time instant to obtain several solutions sets and a second step wherein an SSL method is used to get the sources directions) is the improved accuracy. It happens that some SSL methods are accurate but not particularly robust and artifacts are often detected.

By using several robust SSL methods in the first step, most of the artifacts are suppressed, and by using an accurate SSL method in the second step, final results will be both robust (thanks to the first step) and accurate (thanks to the second step) even if the SSL methods used in the first step are not accurate and the SSL method used in the second step is not robust.

At least parts of the method according to the invention may be computer implemented. Accordingly, the present invention may take the form of an entirely hardware embodiment, an entirely software embodiment or an embodiment combining software and hardware aspects which may all generally be referred to herein as a "device" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium, for example a tangible carrier medium or a transient carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF EMBODIMENTS OF THE INVENTION

The invention provides methods and devices for determining a direction of at least one sound source from an array of microphones.

As described below with reference to several examples, a method according to the invention comprises the step of obtaining a plurality of solutions sets (a solution defines a sound direction candidate) from audio signals acquired from the microphones array, each solutions set being obtained by applying a sound source localization (SSL) method to the audio signals. Different sets can be obtained by applying different SSL methods at the same time and/or by applying a single SSL method at different time instants.

A method according to the invention further comprises the steps of grouping the solutions into groups of solutions and removing at least one of the groups based on a criterion of disparity between the solutions sets, and obtaining the direction of at least one sound source from directions associated with the remaining groups.

Such method takes advantage of disparities between the several SSL methods or the several time instants for the same SSL method to reduce the number of sound direction candidates from which the outputs are selected.

Discrimination between actual sound directions and artifacts is thus improved.

This is because the inventors have observed several disparity situations.

They found that when applying a same SSL method at several time instants, the found solutions BM that would correspond to the real sources RS were never really at the same position in an angular spectrum while varying randomly around and close to an average position. But they noticed that the solution resulting from a random noise greatly vary over time. They concluded that there is a natural disparity in time between solutions of an SSL method from which determination of real solutions may be improved.

The inventors also observed the behaviour of solutions obtained from different SSL methods. They found that solutions positioned around an average position which is common to several angular spectrum (i.e. to several SSL methods) corresponded generally to real solutions. The other solutions (i.e. those which positions are very different from a spectrum to another) generally happened to be artifacts. Therefore, they concluded that there is a stronger disparity in space between false solutions (i.e. artifacts) than between real solutions obtained from different SSL methods.

The invention is based on the disparity properties described above, that are used to improve artifact clearing.

Figure 3:
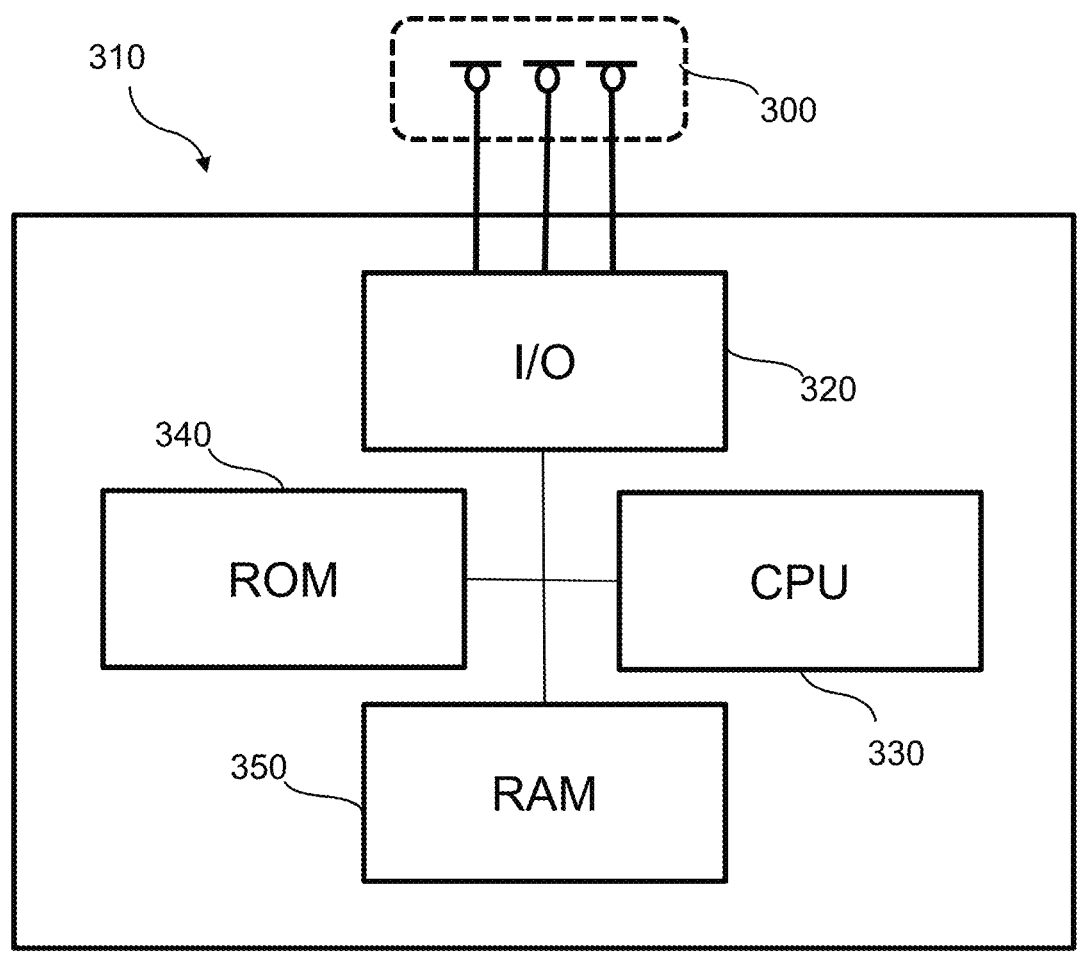
FIG. 3 schematically shows a device according to the invention.

FIG. 3 schematically shows a device 310 for determining a direction of at least one sound source from an array of microphones, configured to implement embodiments of the present invention.

The device 310 may be included in a system such as a micro-computer, a workstation or a portable device. The device 310 comprises a communication bus to which are preferably connected:

- a central processing unit 330, such as a microprocessor, denoted CPU;
- a read only memory 340, denoted ROM, for storing computer programs for implementing the invention;
- a random access memory 350, denoted RAM, for storing the executable code of embodiments of the invention as well as registers adapted to record variables and parameters necessary for implementing methods according to embodiments of the invention; and
- a communication or input/output interface 320, denoted I/O connected to an array 300 here of three microphones, each able to acquire audio signals of a plurality of sound sources; obviously, the array can be of more than three microphones; the interface 320 is adapted to receive such audio signals and to transmit them to the central processing unit 330 for processing according to the invention.

The central processing unit 330 is adapted to control and direct the execution of the instructions or portions of software code of the program or programs according to the invention. On powering up, the program or programs that are stored in a non-volatile memory, for example in the read only memory 340, are transferred into the random access memory 350, which then contains the executable code of the program or programs, as well as registers for storing the variables and parameters necessary for implementing the invention.

Such software comprises obtaining instructions, grouping instructions, removing instructions, to perform the corresponding steps as they will be described after in reference to FIG. 4a, 4b, 5 or 6.

The communication bus provides communication and interoperability between the various elements included in the device 310 or connected to it. The representation of the bus is not limiting and in particular the central processing unit is operable to communicate instructions to any element of the device 310 directly or by means of another element of the device 310.

By implementing the invention, device 310 comprises means adapted to perform each step described below. In particular, such device comprises:

- means for obtaining a plurality of solutions sets from audio signals acquired from the microphones array 300, each solutions set being obtained by applying a SSL method to the audio signals, each solution defining a sound direction candidate;
- means for grouping the solutions into groups of solutions;
- means for removing at least one of the groups based on a criterion of disparity between the solutions sets; and
- means for obtaining the direction of at least one sound source from directions associated with the remaining groups.

Figure 4A:
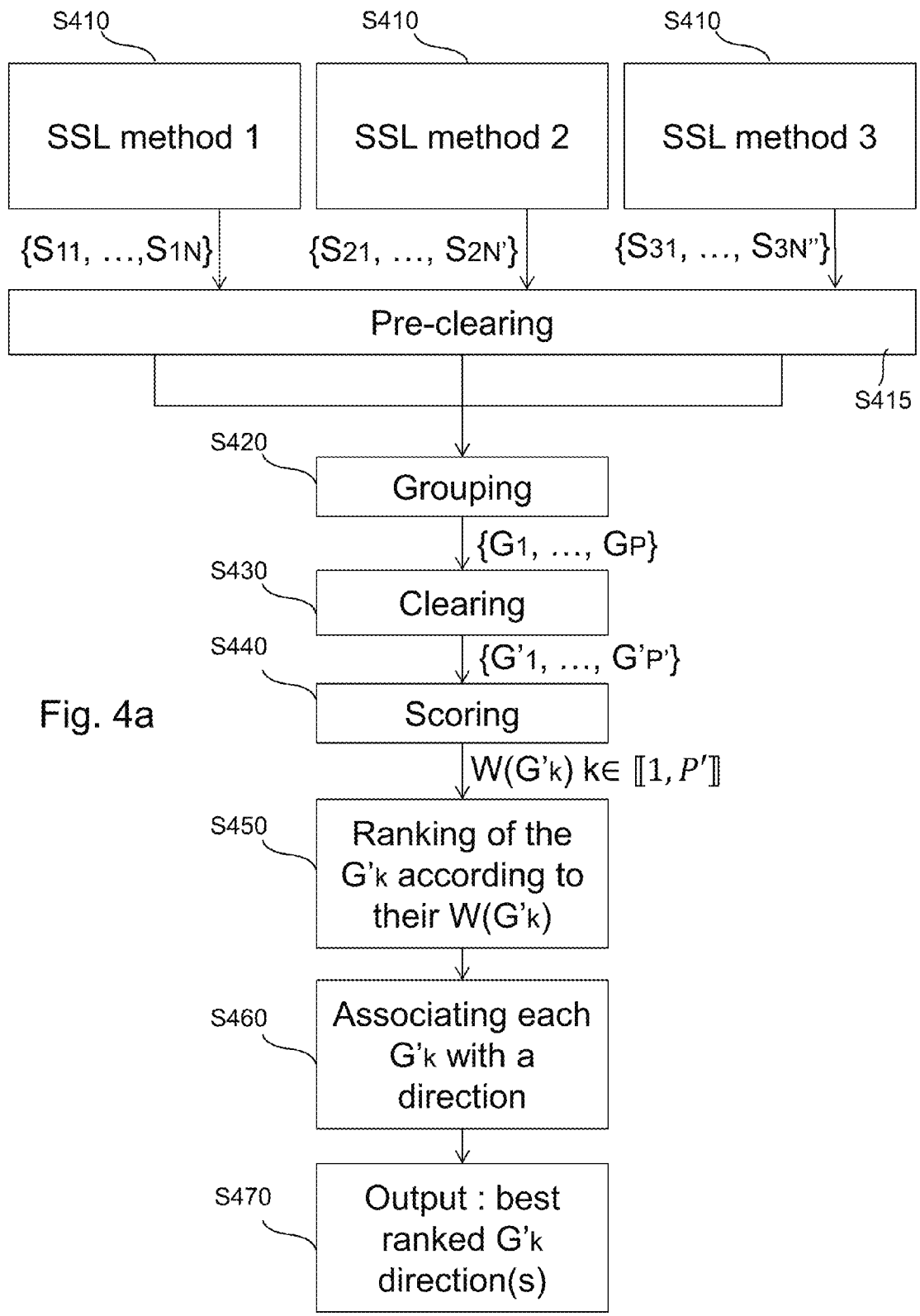
FIGS. 4a and 4b are flowcharts illustrating general steps of a determination method according to embodiments of the invention, based on solutions sets obtained from several sound source localization methods at one time instant.
Figure 4B:
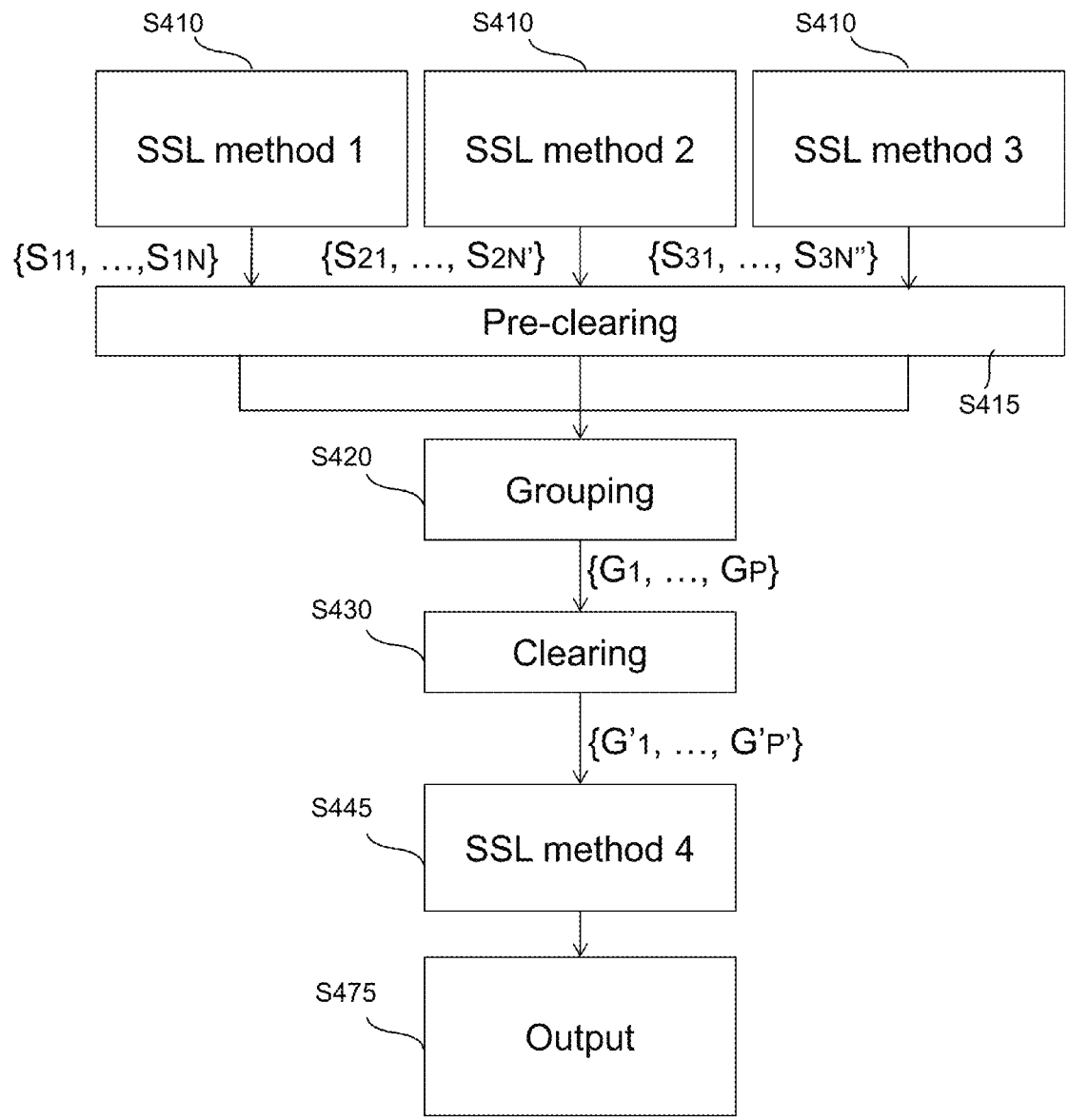

FIGS. 4a and 4b are flowcharts illustrating general steps of a method for determining a direction of at least one sound source from an array of microphones, according to embodiments of the invention. Such method is for example performed at the device 310 of FIG. 3.

In the examples of FIGS. 4a and 4b, the method is based on solutions sets obtained here from three different SSL methods at one time instant. Of course, embodiments of the invention may use two, three or more SSL methods.

Referring to FIG. 4a, the device 310 obtains, at step S410, three sets of solutions by applying to audio signals three different SSL methods. These sets are for example the candidate or possible directions that each different SSL method has determined.

For example, the SSL methods 1, 2 and 3 can be angular-spectra-based methods like: MUSIC, SRP-PHAT or MVDR. Obviously, the SSL methods can be another SSL method.

In one embodiment, the SSL methods can be selected from a pool of SSL methods depending on the sound environmental conditions in order to increase the efficiency of the overall method.

For example, such sound environmental conditions are the noise level, the reverberation level, indoor/outdoor conditions.

Figure 1:
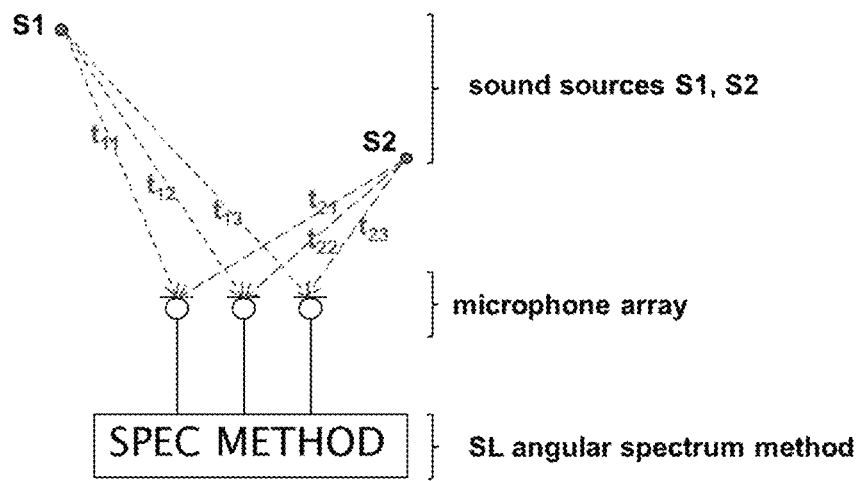
FIG. 1 schematically shows the physical principle of SSL.
Figure 2:
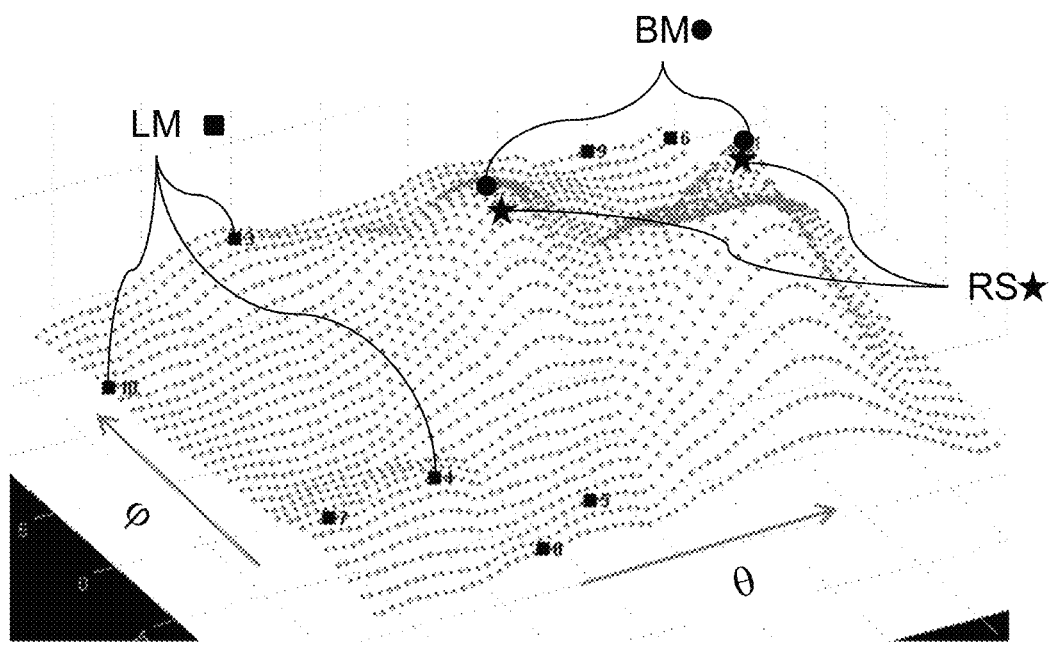
FIG. 2 shows an example of angular spectrum.

In practice, as explained above, applying such an angular-spectra-based SSL method comprises preliminary signal processing of audio signals acquired from the microphones array 300, to generate an angular spectrum $m=F(\theta, \phi)$ as exemplary shown in FIG. 2. Then, local maxima of the angular spectrum are identified as corresponding to possible sound direction solutions, also called sound direction candidates or merely solutions.

Hereafter, the following notations are adopted: the $i^{th}$ solution (it can be for example the solution corresponding to the $i^{th}$ highest magnitude in the angular spectrum) obtained from the SSL method number j is denoted $S_{ji}((\theta, \phi), m)$, or merely $S_{ji}$. For instance, the solution from the SSL method 1 having the highest magnitude is denoted $S_{11}$, the second highest $S_{12}$, and so on.

So, the SSL method 1 leads to obtaining a set of N solutions $\{S_{11}, \ldots, S_{1N}\}$, the SSL method 2 leads to obtaining a set of N' solutions $\{S_{21}, \ldots, S_{2N'}\}$ and the SSL method 3 leads to obtaining a set of N" solutions $\{S_{31}, \ldots, S_{3N''}\}$ where N, N' and N" may be the same or may be different.

In order to remove obvious false sound direction or artifacts, pre-processing consisting in preliminary cleaning or removing artifacts can be performed at optional step S415.

For example, to lessen edge effects, all the local maxima comprised in an edge margin of the angular spectrum, for example at a distance smaller than five degrees from each edge in the angular spectrum, are removed from the set of solutions.

In a variant or in addition to that first removing, all the local maxima having a magnitude m smaller than a predetermined value are removed.

In another variant or in addition to any removing above, only the ten highest local maxima can be kept into the set of solutions, and the others removed.

After the different SSL methods have been applied, the resulting sets of solutions are compared in order to remove solutions from one set that have no close or collocated neighbours in the other sets.

The closeness may depend on a predetermined margin or distance of five degrees for example, to evaluate whether two solutions from two angular spectra are collocated.

At step S420, the three sets of solutions obtained at step S415 are put together and solutions are grouped into groups $G_k$ based on the closeness and collocation criterion. The resulting set of groups is denoted $\{G_1, \ldots, G_P\}$ wherein $P \leq N+N'+N''$. An example of such grouping is shown on FIG. 7.

Figure 7:
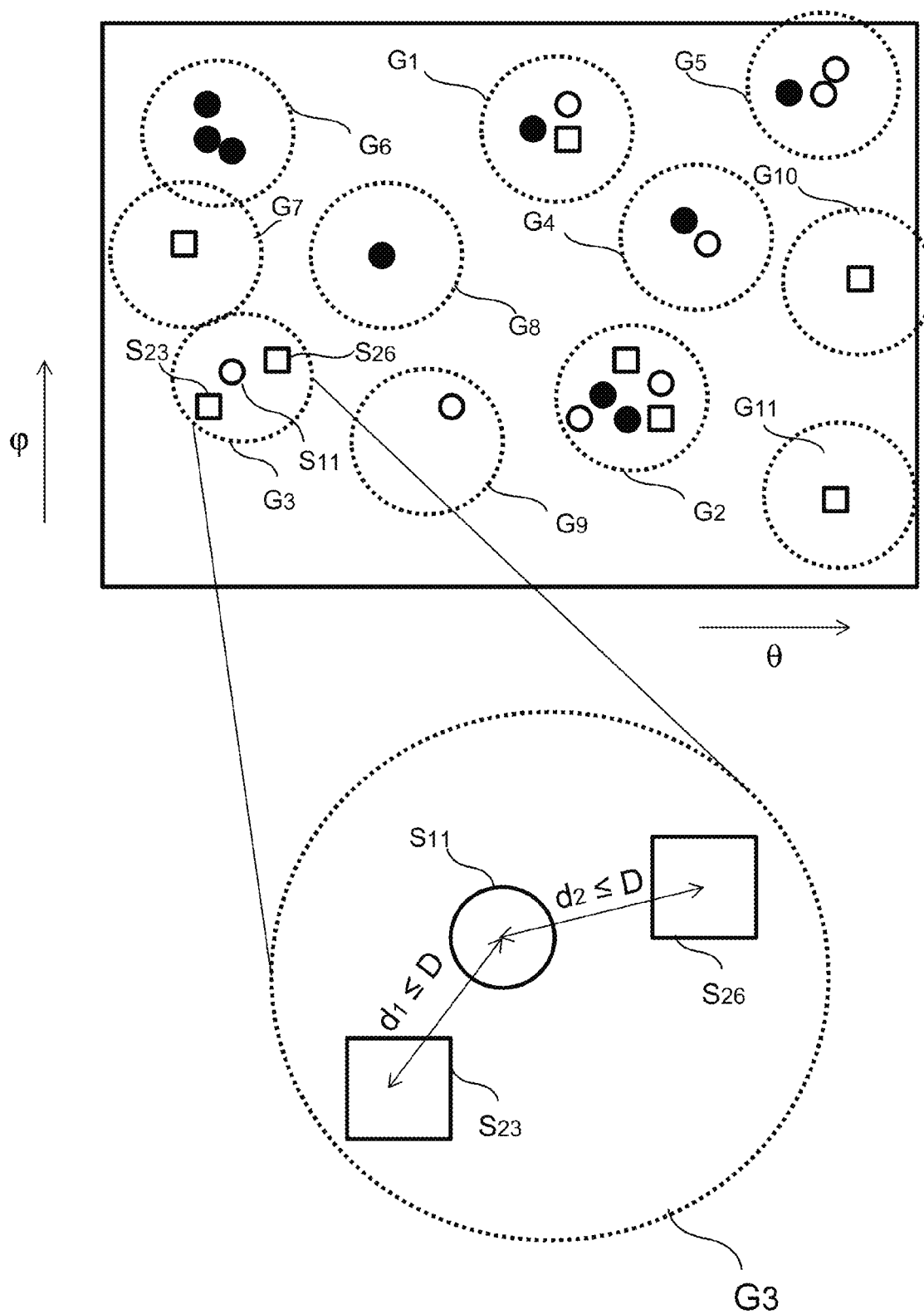
FIG. 7 schematically illustrates an example of solutions grouping in an angular spectrum.

FIG. 7 schematically shows an angular spectrum with a first set of N=8 solutions represented by squares, a second set of N'=8 solutions represented by white circles and a third set of N"=9 solutions represented by black circles. Finally, on FIG. 7, there are N+N'+N"=25 solutions.

In the context of FIG. 4a, the three sets are from the three SSL methods described above. However, in a variant described after in reference to FIG. 5, these three sets can be from one SSL method applied at three time instants.

Back to FIG. 7, in that example, the grouping of step S420 is based on a grouping distance D and on magnitudes of solutions. In particular, solutions, i.e. corresponding points in the angular spectrum, of each set that are associated with the highest magnitudes m (i.e. using the notation: the $S_{ji}$, with the highest i) are successively chosen as references points in the angular spectra and the solutions represented by points that are at a distance smaller than D from the reference points are grouped into a group $G_k$ (e.g. $G_1, G_2, G_3, G_4, G_5, G_6$).

For example, the solution $S_{11}$, which is a white circle, is first chosen as a reference point because it is associated with the highest magnitude of sound localization method 1. Close to this reference point, there are two squares $S_{23}$ and $S_{26}$ separated from the reference point $S_{11}$ by respective distances $d_1 \leq D$ and $d_2 \leq D$. These points are so grouped with the reference point $S_{11}$ into a group $G_3$.

The solution $S_{2i}$ having the highest magnitude is then considered if it is not already in the group $G_3$.

When all the groups comprising the reference points are formed, other reference points are chosen among the remaining points. For example, based on the same principle, the remaining point from each method associated with the highest magnitude is chosen as a reference point and grouping is performed again with the grouping distance.

At the end, when a solution is separated from all the others by a distance higher than D, it becomes itself a group, as it is the case for $G_7, G_8, G_9, G_{10}$ and $G_{11}$. Finally, on FIG. 7, there are 11 groups i.e. P=11.

Note that it may happen that a same solution belongs to two or more groups. It is the case for example when a solution already added to a group is not excluded from the solutions on which the grouping is being performed.

In this case the groups sharing the same solution can be merged into one single bigger group, or the shared solution can be added to the group which is not cleared at step 430 (that step will be described below) and give the highest scoring at step 440 (that step will be described below) compared to the other groups sharing that solution. The shared solution is then withdrawn from the other groups.

In a variant of the grouping of FIG. 7 which is based on a reference point, the grouping S420 can consist in grouping step by step the solutions that are close enough, so as to chain the close solutions into a group. The start point of that chaining may be randomly chosen. When all the close solutions are grouped by chaining, another start point may be chosen outside of any chain or group and another group is obtained by such grouping.

It has to be noticed that the grouping is independent from the original set of solutions. Consequently, at that stage of the process and in the context of FIG. 4a, groups can be indifferently made of solutions from only one SSL method (e.g. $G_6$), or from several SSL methods (e.g. $G_1, G_4$).

Figure 6:
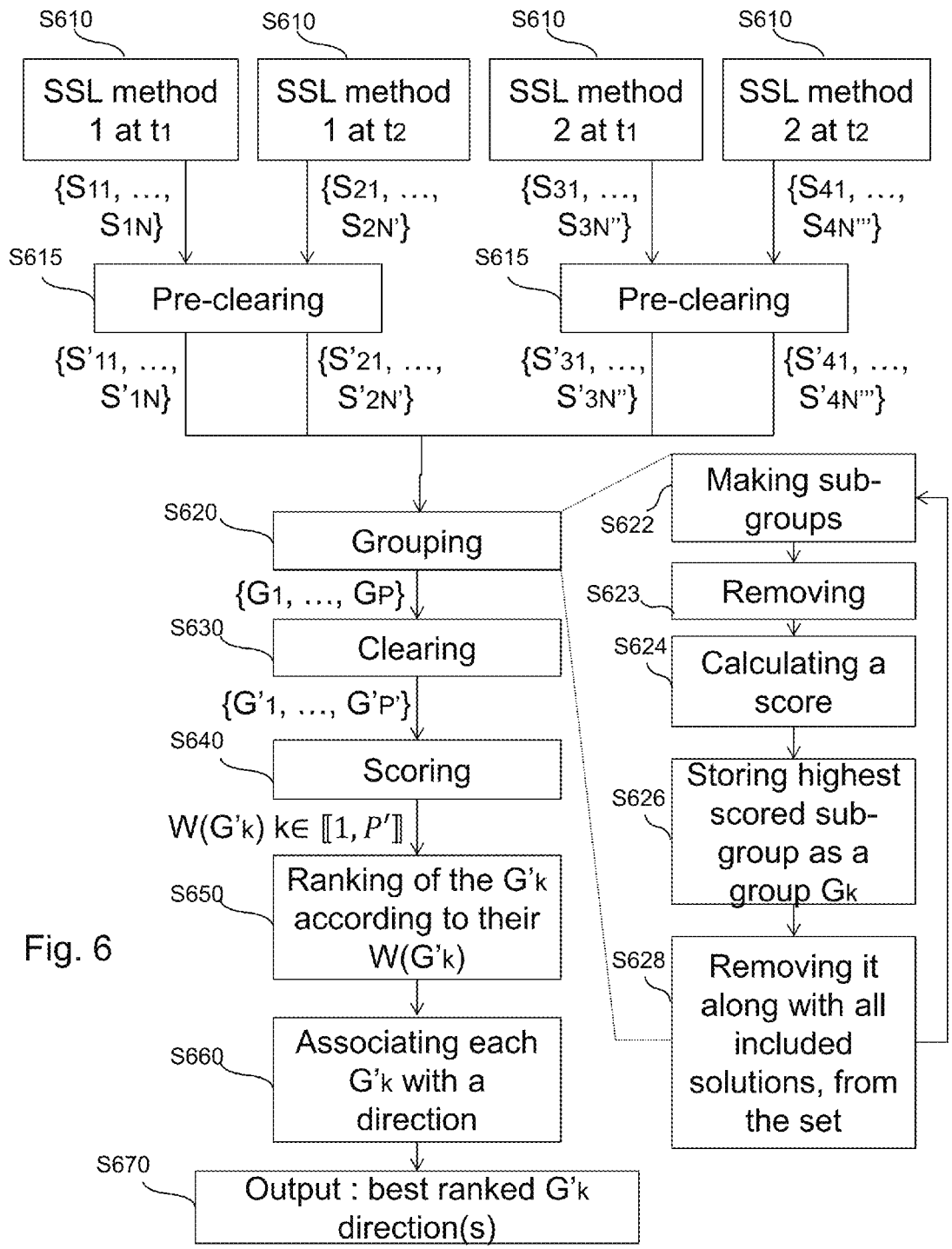
FIG. 6 is a flowchart illustrating general steps of a determination method according to embodiments of the invention, based on solutions sets obtained from several sound source localization method at several time instants.

Another example of grouping that can be implemented in the method of FIG. 4a as a variant is described after in reference to FIG. 6.

At step S430, the device 310 performs a removing or clearing on the groups set based on a criterion of disparity between the solutions sets, in order to get rid of artifacts. This step leads to a sub-set of groups $\{G'_1, \ldots, G'_{P'}\}$ wherein $P' \leq P$ and $G'_k \in \{G_1, \ldots, G_P\}$, $k \in [1, \ldots, P']$.

Figure 8A:
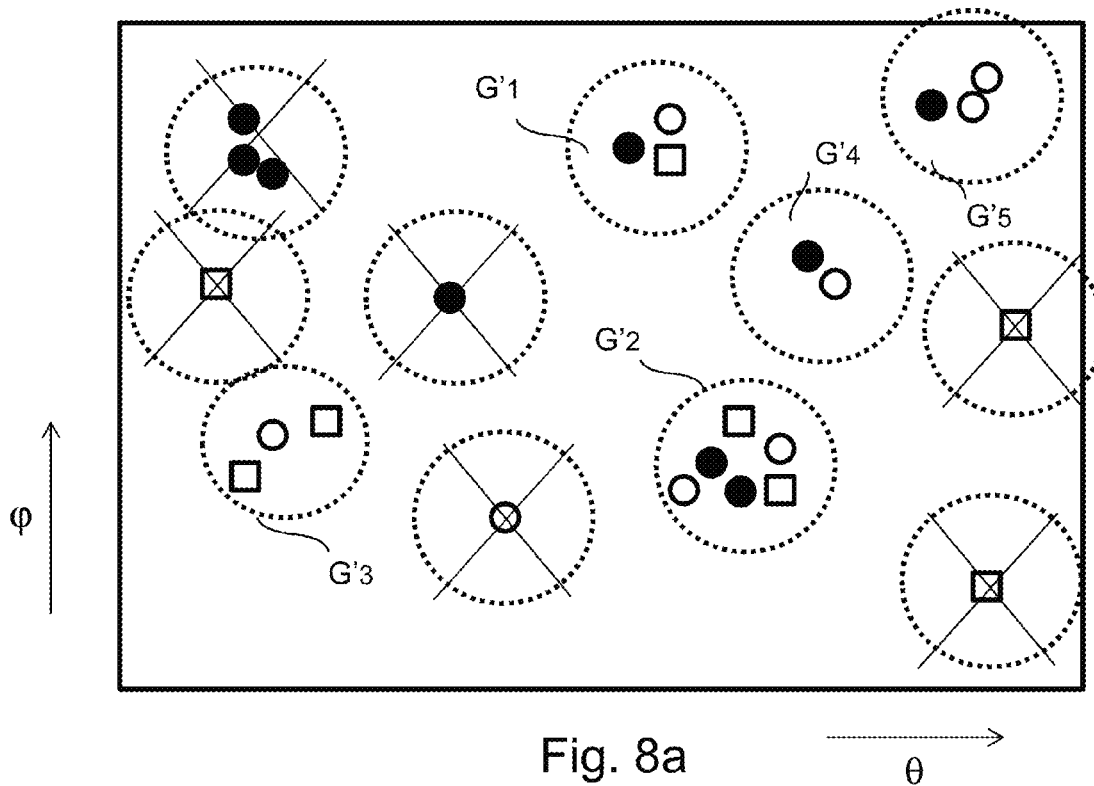
FIGS. 8a and 8b schematically illustrate two examples of groups removing, in the angular spectrum of FIG. 7.
Figure 8B:
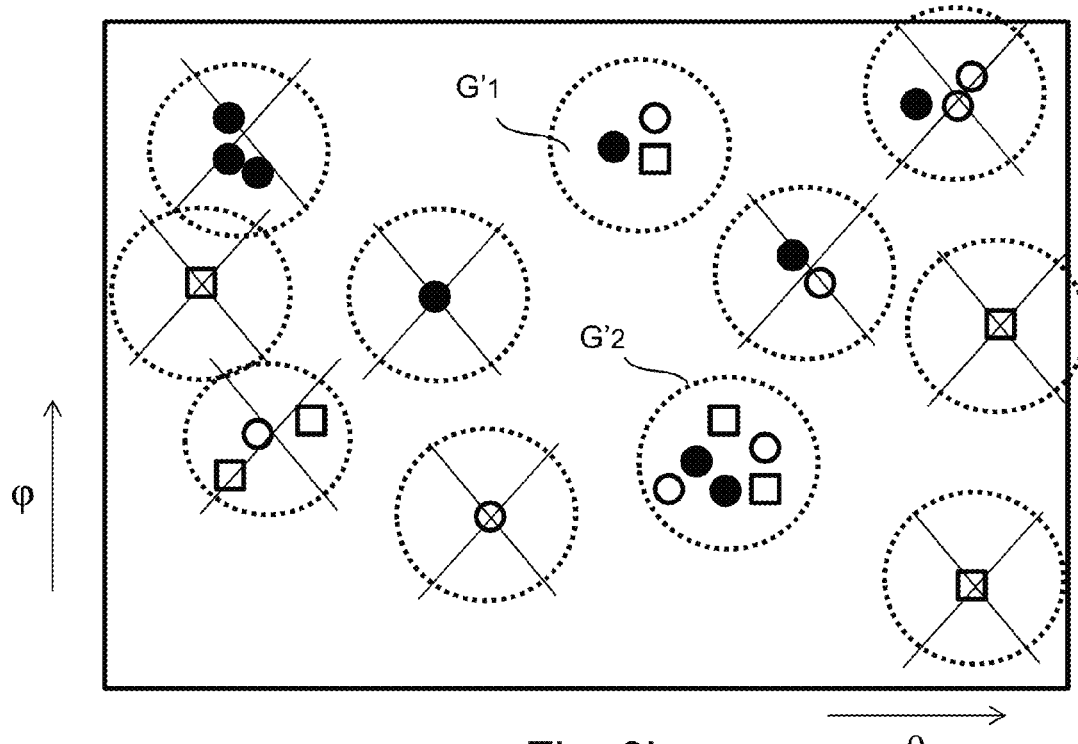

FIGS. 8a and 8b schematically illustrate two different examples of clearing S430 (of the set of groups of FIG. 7) having a different selectivity.

On FIG. 8a, the clearing is not very selective. In practice, such a clearing leads to detecting all the real sources but is likely to keep artifacts in the resulting set of groups (after removal). The clearing S430 here consists in removing groups comprising only solutions from the same set. For example, on FIG. 8a, all the groups comprising only squares or only black circles or only white circles are removed. The remaining groups are $G'_1=G_1$, $G'_2=G_2$, $G'_3=G_3$, $G'_4=G_4$, $G'_5=G_5$, and $P'=5$.

In a variant, on FIG. 8b, the clearing is more selective. In practice, such a clearing leads to very accurate results (i.e. no artifacts) but not necessarily to all the results (i.e. some of the real sources may be removed). The clearing S430 here consists in keeping groups comprising at least one solution from each set j. In the example of FIG. 6b, only the groups comprising at least a square, at least a black circle and at least a white circle are kept and all the others are removed. The remaining groups are $G'_1=G_1$, $G'_2=G_2$, and $P'=2$.

Obviously, any intermediate level of selectiveness can be chosen for clearing step S430.

At step S440, the device 310 computes a score $W(G'_k)$ for each remaining group $G'_k$ based on the magnitudes of the solutions of that group. This score $W(G'_k)$ is representative of the magnitude $m(S_{ji})$ of the solution(s) $S_{ji}$ included in the corresponding group.

In order to better take into account the contribution of each SSL method into the scores of the remaining groups, a contributing score $W_j(G'_k)$ of each solutions set j in group $G'_k$ may be calculated.

For example, the resulting score for the remaining group $G'_k$ can be a mere sum of contributing scores:

$$W(G'_k) = \sum_{j=1}^{3} W_j(G'_k)$$

In a variant, a coefficient that for example depends on the sound environmental conditions can be affected to each contributing score:

$$W(G'_k) = \sum_{j=1}^{3} \alpha_j W_j(G'_k)$$

For example, if the SSL method j leads to rather bad results when the environment is noisy, the more noisy the environment, the smaller the corresponding coefficient $\alpha_j$.

In particular, the contributing score $W_j(G'_k)$ for SSL method j may depend on the difference between the maximum magnitude $\max(m(S_{ji} \in G'_k))$ of the solutions set belonging to $G'_k$ and a minimum magnitude $\min(m)$ of the whole spectrum. For example:

$$W_j(G'_k) = \frac{\max(m(S_{ji} \in G'_k)) - \min(m)}{\max(m(S_{ji})) - \min(m)}$$

In this example, the respective contributing scores $W_j(G'_k)$ of the solutions sets j are made comparable to absorb differences of rough sizes between the solutions from different solutions sets. This is achieved by using a ratio with the maximum range of each solution set.

In a variant, the contributing score can be for example:

$$W_j(G'_k) = \frac{\max(m(S_{ji} \in G'_k)) - \min(m)}{\max(m(S_{ji})) - \min(m)} * f(d_j^{max})$$

In this formula, $f$ is a decreasing function and $d_j^{max}$ is a distance, in the angular spectrum, between a point corresponding to the solution $S_{ji}$ verifying $\max(m(S_{ji} \in G'_k))$, that is the solution from the solutions set j having the highest magnitude in the group $G'_k$, and a reference point associated with the remaining group $G'_k$.

The reference point can be for example the point of the group with the highest magnitude or in a variant, it can be a point of an arbitrary search grid over the angular spectrum or the reference point of the grid used at grouping step S420.

The reference point can also be a barycenter of the points of the group.

Obviously, other types of score can be used in step S440. For example, the mean value of the magnitudes of all the solutions forming the group can be used in step S440.

At step S450, remaining groups $G'_k$ are ranked by the device 310 according to their respective score $W(G'_k)$.

At step S460, the device 310 associates each remaining group $G'_k$ with a direction $(\theta'(G'_k); \phi'(G'_k))$ hereafter denoted $(\theta'; \phi')$. That step can be performed at any time of the process as soon as the groups have been created, for example before the ranking step S450.

For example, this direction can be an isobarycenter or mean of the sound direction candidates $(\theta; \phi)$ comprised in the group:

$$\begin{cases} \theta'(G'_k) = \frac{\Sigma s_{ji \in G'_k} \theta(S_{ji})}{\text{Card}(G'_k)} \\ \varphi'(G'_k) = \frac{\Sigma s_{ji \in G'_k} \varphi(S_{ji})}{\text{Card}(G'_k)} \end{cases}$$

where $\text{Card}(G'_k)$ is equal to the number of solutions comprised in the remaining group $G'_k$.

In a variant that gives a more balanced direction, the direction of each remaining group $G'_k$ is a barycenter of the sound direction candidates $(\theta; \phi)$ with weights corresponding to their respective magnitudes m, for example:

$$\begin{cases} \theta'(G'_k) = \frac{\Sigma s_{ji \in G'_k} \theta(S_{ji}) * m(S_{ji})}{\Sigma s_{ji \in G'_k} m(S_{ji})} \\ \varphi'(G'_k) = \frac{\Sigma s_{ji \in G'_k} \varphi(S_{ji}) * m(S_{ji})}{\Sigma s_{ji \in G'_k} m(S_{ji})} \end{cases}$$

In another variant, the corresponding weights can be computed as equal to $f(d_{ji})$, $f$ being defined above and $d_{ji}$ being the distance in the angular spectrum between the reference point of the group $G'_k$ and the solution $S_{ji}$.

In another variant, the direction is a barycenter of means $\overline{\theta_1}$, $\overline{\theta_2}$, $\overline{\theta_3}$ of the sound direction candidates from each solutions set composing the remaining group considered:

$$\begin{cases} \theta'(G'_k) = \frac{\overline{\theta_1(S_{1i} \in G'_k)} + \overline{\theta_2(S_{2i} \in G'_k)} + \overline{\theta_3(S_{3i} \in G'_k)}}{3} \\ \varphi'(G'_k) = \frac{\overline{\varphi_1(S_{1i} \in G'_k)} + \overline{\varphi_2(S_{2i} \in G'_k)} + \overline{\varphi_3(S_{3i} \in G'_k)}}{3} \end{cases}$$

That variant makes it possible to avoid favoring an SSL method from another one even if the first one gives more solutions.

At step S470, the directions (θ'; φ') of the best ranked group or groups $G'_k$ are selected and output. The number of directions to output can be predetermined.

In a variant, at step 470, only the sound direction candidates from one specific solutions set included in the best ranked group(s) may be output, or directions of the best ranked groups calculated only with the sound direction candidates from only one solutions set may be output, even if clearing and ranking steps have been performed on all the solutions sets.

In another variant, the associating step S460 may follow directly the clearing step S430, without any scoring nor ranking. In this case, all the directions of the remaining groups may be output at step S470 or only the sound direction candidates from one specific solutions set may be output at step S470.

In both variants, it may be interesting to output only the sound direction candidates from one solutions set, in particular in the case it corresponds to an SSL method known to be accurate but not robust. Indeed, the clearing step allows removing the least probable solutions in comparison with other SSL methods, so that the results are finally more robust than if only one SSL method is applied like in the prior art.

Referring to FIG. 4b, the device 310 performs the steps of obtaining (S410) sets of solutions $S_{ji}$, pre-clearing (S415) these solutions sets, grouping (S420) these solutions into groups $G_k$ and clearing (S430) the resulting set of groups in order to get rid of artifacts, as described hereabove referring to FIG. 4a. These steps result in obtaining the sub-set of remaining groups $\{G'_1, \ldots, G'_{P'}\}$.

The device 310 then applies, at step S445, an SSL method to the cleared set of groups. That is, the other SSL method is applied to the solutions of the remaining groups corresponding to the non-crossed out doted circles shown in FIGS. 8a and 8b. Thus, it is to be noted that in the approach of FIG. 4b, the SSL method is not applied to the whole search space.

That other SSL method is for example a modified MVDR method, which is accurate but not particularly robust. It may also be one of the SSL methods used at step S410. Since the search space is now limited to areas containing solutions for sure, the probability of error is reduced.

At step S475, the directions of the solutions obtained from the SSL method applied to remaining groups at step S445 are output.

The embodiment of FIG. 4b is easy to implement since its steps S410 and S445 rely on SSL methods already existing in the devices.

Figure 5:
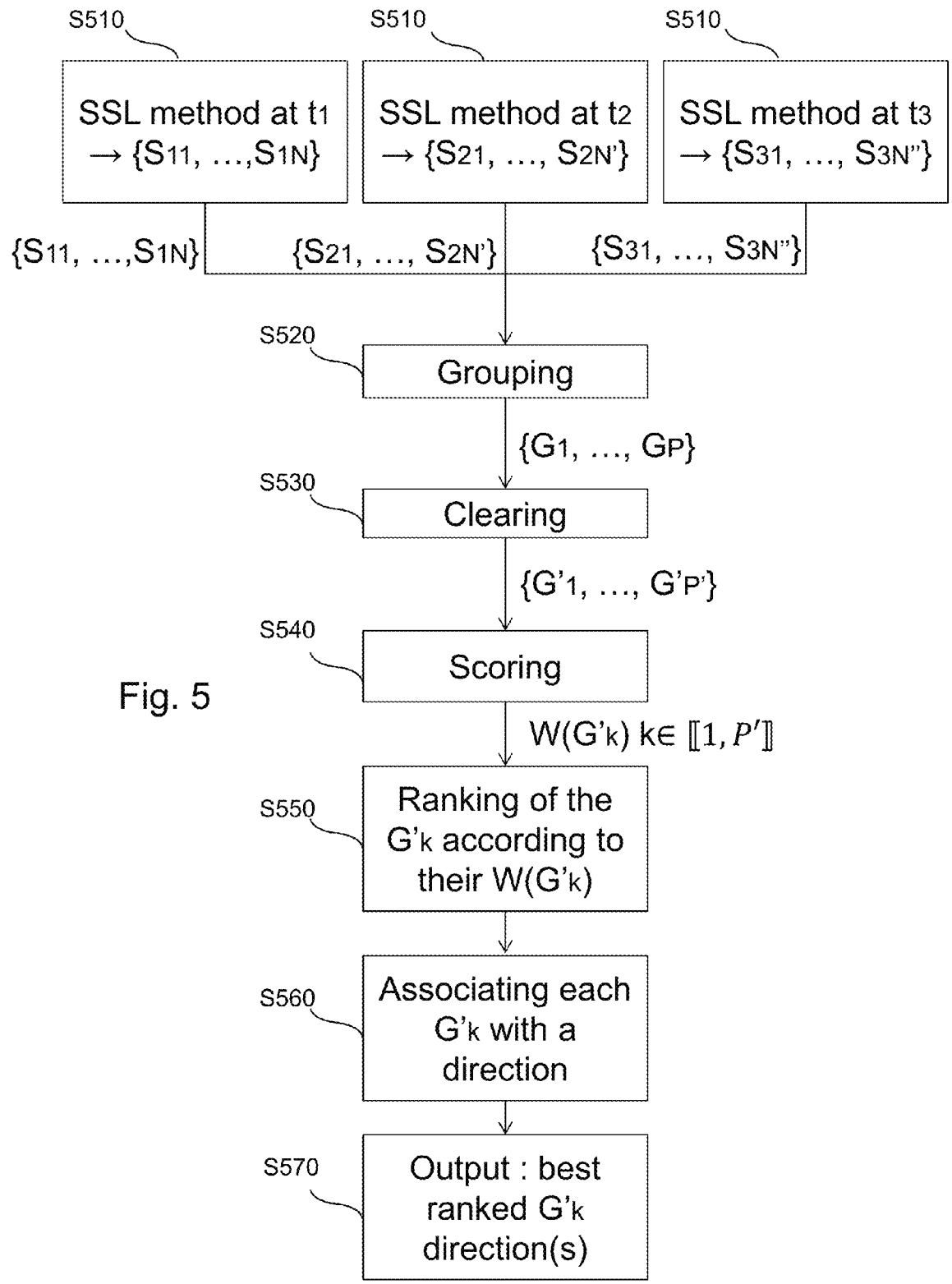
FIG. 5 is a flowchart illustrating general steps of a determination method according to embodiments of the invention, based on solutions sets obtained from a same sound source localization method at several time instants.

FIG. 5 is a flowchart illustrating general steps of a method for determining a direction of at least one sound source from an array of microphones, according to embodiments of the invention. Such method is for example performed at the device 310 of FIG. 3.

In the example of FIG. 5, the method is based on solutions sets obtained at step S510 from a same SSL method applied at three or more time instants $t_1, t_2, t_3$.

For example, the SSL method can be an angular-spectra-based method like: MUSIC, SRP-PHAT or MVDR, which general principle has been described above in reference to FIG. 4a.

In that example, the following notations are adopted: the $i^{th}$ solution (it can be for example the solution corresponding to the $i^{th}$ highest magnitude in the angular spectrum) obtained at the $j^{th}$ time instant is denoted $S_{ji}((\theta; \phi), m)$, or merely $S_{ji}$.

So, the SSL method at the first time instant leads to obtaining a set of N solutions $\{S_{11}, \ldots, S_{1N}\}$, the SSL method at the second time instant leads to obtaining a set of N' solutions $\{S_{21}, S_{2N'}\}$ and the SSL method at the third time instant leads to obtaining a set of N" solutions $\{S_{31}, \ldots, S_{3N''}\}$ where N, N' and N" may be the same or may be different.

Starting from the obtained sets of solutions, the rest of the process is similar to steps S420 to S475 of FIG. 4a.

For example, at step S520, the three sets of solutions are put together and solutions are grouped into groups $G_k$, as described above in reference to step S420 of FIG. 4a.

The steps of grouping S520, clearing S530, scoring S540, ranking S550, associating S560 and output S570, are the same as those described above with reference to FIG. 4a (grouping S420, clearing S430, scoring S440, ranking S450, associating S460 and output S470).

In the context of FIG. 5, the three sets shown on FIG. 7 or 8a or 8b, i.e. the set of squares, the set of black circles and the set of white circles, correspond to the three different time instants $t_1, t_2, t_3$. Consequently, the description of these Figures can also apply to the grouping step S520 and the clearing step S530 of FIG. 5.

FIG. 6 is a flowchart illustrating general steps of a method for determining a direction of at least one sound source from an array of microphones, according to embodiments of the invention. Such method is for example performed at the device 310 of FIG. 3.

In the example of FIG. 6, the method is based on solutions sets obtained at step S610 from two or more SSL methods, some or all being applied at two or more time instants $t_1, t_2$.

In that example, $S_{ji}((\theta; \phi))$, m=$S_{ji}$ represents the $i^{th}$ solution (it can be for example the solution corresponding to the $i^{th}$ highest magnitude in the angular spectrum) obtained by applying a certain method at a certain time instant, both represented by a couple j=(method; time). For example, on FIG. 6, the $i^{th}$ solution obtained by applying a first SSL method at a first time instant is denoted $S_{1i}$, the $i^{th}$ solution obtained by applying the first SSL method at a second time instant is denoted $S_{2i}$, the $i^{th}$ solution obtained by applying a second SSL method at the first time instant is denoted $S_{3i}$ and the $i^{th}$ solution obtained by applying the second SSL method at the second time instant is denoted $S_{4i}$.

A pre-clearing S615 is optionally performed between the two or more solutions sets obtained from a same SSL method at two or more different time instants, in order to get rid of the obvious artifacts revealed from the disparity among solutions obtained at the different time instants.

It can consist in checking if, to each solution of the solutions set obtained at a first time instant, corresponds a close solution in the solutions set obtained at the second time instant and vice versa. If not, the solution is removed from the solutions set.

A plurality of solutions sets is thus obtained starting from those sets. The rest of the process may be similar to FIG. 4a or 4b described above.

After that pre-clearing, the two or more resulting sets of solutions, denoted $\{S'_{11}, \ldots, S'_{1N}\}$, $\{S'_{21}, \ldots, S'_{2N'}\}$, $\{S'_{31}, \ldots, S'_{3N''}\}$, $\{S'_{41}, \ldots, S'_{4N'''}\}$ are put together and solutions are grouped (step S620) into groups $G_k$ as described above.

In embodiments, the grouping step can alternatively be performed in an iterative way, by scanning the whole angular spectrum along an arbitrary search grid.

More precisely, the iterative loop may comprise the steps of making sub-groups (S622) of solutions by grouping the solutions that correspond to points belonging to a predetermined circle around each point of the search grid, calculating (S624) a score for each sub-group as described above with reference to step S440 of FIG. 4a, keeping aside (S626) the remaining sub-group having the highest score by storing it into a memory such as a non-volatile memory 340 or a volatile memory 350, and removing (S628) the solutions of the stored sub-group from the solutions sets available at the beginning of the loop. The next iteration of the loop starts with the remaining solutions. The number of remaining solutions thus decreases from one iteration to the other.

The grouping step (S620) may optionally comprise a step of removing (S623) any sub-group that does not meet a criterion of disparity between the solution set, as is described with reference to FIG. 4a for the step of removing (S430) some groups.

The sub-groups resulting from that iterative grouping (i.e. the sub-groups kept aside) form the set of groups resulting from steps S420/S520/S620.

The iterative process can be performed until there is no solution left. In a variant, it can be stopped after a predefined number of loops i.e. as soon as a predefined number of groups has been generated.

This iterative process can be implemented at steps S420 and S520 of FIGS. 4a, 4b and 5.

The steps of clearing S630, scoring S640, ranking S650, associating S660 and output S670, are also the same as those described above with reference to FIG. 4a (clearing S430, scoring S440, ranking S450, associating S460 and output S470).

Experiments have been conducted by the inventors using a 4-microphone array to identify two sound sources combining three SSL methods (one MUSIC-based SSL method, one MVDR-based SSL method, and one SRP-PHAT-based SSL method).

Two different rooms with different relative positioning of the microphone array and of the sound sources have been used, as well as two pairs of sound sources: two females or one female and one male.

Figure 9:
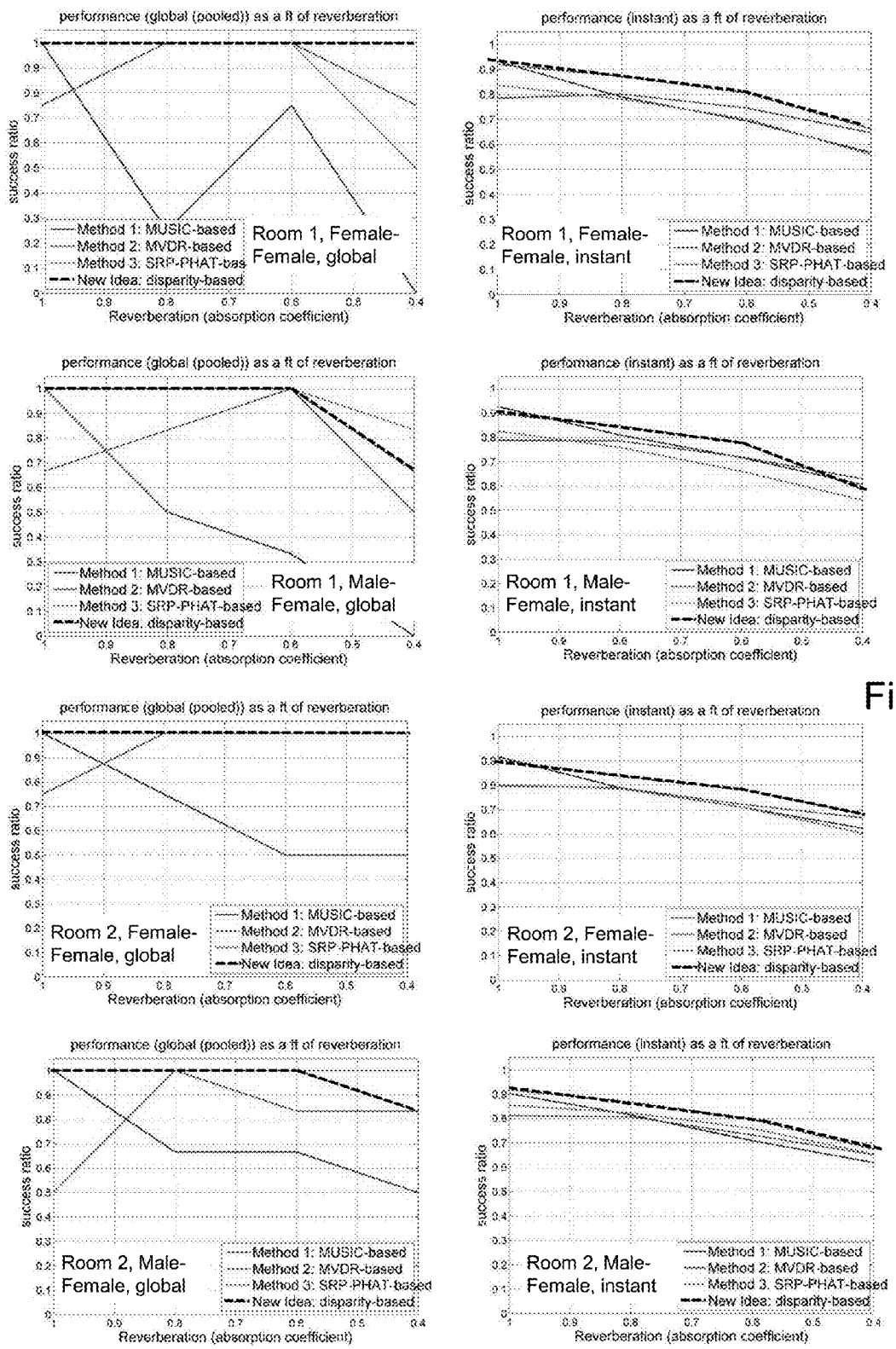
FIG. 9 shows plots of results from experiments comparing the invention and SSL methods taken alone when localizing two sound sources.

FIG. 9 shows the results of the experiments in localizing the sound sources. It may be observed that the present invention gives on overall better results than the conventional SSL methods taken alone for both the SLL method combining approach (i.e. global or pool localization task as described above with reference to FIG. 4) and the instant time combining approach (i.e. instant localization task as described above with reference to FIG. 5).

In addition, the method according to the invention does not require much more resources than algorithms based on individual SSL methods. Indeed, the memory usage is basically the same as for individual SSL methods, since the memory is freed after each SSL method computation.

The computation time of the method according to the invention is a bit increased in comparison to algorithms based on individual SSL methods. For example, the computation time of the method is approximately 8% more than the one of the method MUSIC which is one of the slowest SSL methods. This is because a plurality of solutions sets has to be obtained and for that SSL methods are calculated several times. But many computation steps are common to all SSL methods and the additional steps of disparity-based processing (e.g. grouping step S420 and removing step S430) can be easily implemented in a systematic way, thus being computed very fastly.

For these reasons, a disparity-based method for determining the direction of sources according to the invention provides better synergy results without requiring much more resources than in the prior art.

Although the present invention has been described hereinabove with reference to specific embodiments, the present invention is not limited to the specific embodiments, and modifications which lie within the scope of the present invention will be apparent to a person skilled in the art. Many further modifications and variations will suggest themselves to those versed in the art upon making reference to the foregoing illustrative embodiments, which are given by way of example only and which are not intended to limit the scope of the invention as determined by the appended claims. In particular different features from different embodiments may be interchanged, where appropriate.

The invention claimed is:

1. A method of determining a direction of at least one sound source from an array of microphones, comprising:
    obtaining a plurality of solutions sets from audio signals acquired from the microphones array, each solutions set being obtained by applying a sound source localization method to the audio signals, each solution defining a sound direction candidate;
    grouping the solutions of the plurality of sets into groups of solutions;
    removing at least one of said groups based on a criterion of disparity between the solutions sets; and
    obtaining the direction of said at least one sound source from directions associated with the remaining groups.

2. The method of claim 1, wherein the directions of a plurality of sound sources are determined.

3. The method of claim 1, wherein at least two solutions sets are obtained by applying at least two sound source localization methods at the same time instant.

4. The method of claim 1, wherein at least two solutions sets are obtained by applying the same sound source localization method at two or more time instants.

5. The method of claim 4, comprising performing a removing of solutions obtained by the same sound localization method based on a criterion of disparity between the solutions sets obtained at the two or more time instants.

6. The method of claim 1, comprising comparing the solutions sets to remove a solution from one of the solutions sets when a given number of the other solutions sets do not comprise a solution collocated to the solution to remove, given a predetermined margin.

7. The method of claim 1, comprising removing the solutions having sound direction candidates within a predetermined edge margin of a search space of directions.

8. The method of claim 1, comprising removing from at least one solutions set, the solutions associated with a magnitude smaller than a predetermined value.

9. The method of claim 1, comprising within at least one solutions set, keeping a predetermined number of the solutions associated with highest magnitudes and removing the other solutions.

10. The method of claim 1, wherein each solution corresponds to a point representing the sound direction candidate in an angular spectrum, and said grouping comprises grouping the solutions that correspond to points belonging to a predetermined area in the angular spectrum.

11. The method of claim 1, wherein each solution corresponds to a point in an angular spectrum at the sound direction candidate and wherein said grouping comprises iteratively performing the following steps:
    grouping into sub-groups the solutions that correspond to points belonging to a predetermined area in the angular spectrum, said predetermined area being associated with a reference point of a search angular spectrum grid;
    calculating a score for each sub-group, based on magnitudes associated with the solutions composing the subgroup;

keeping aside the sub-group having the highest score; and removing from the remaining solutions sets, the solutions of the sub-group kept aside, to obtain solutions to be considered for the next iteration;

the groups of solutions resulting from the iterative grouping being the sub-groups kept aside.

12. The method of claim 11, further comprising removing any sub-group that does not meet a criterion of disparity between the solutions sets, and wherein the steps of calculating, keeping aside and removing the solutions of the sub-group kept aside are performed on the remaining sub-groups.

13. The method of claim 1, wherein said removing at least one of the groups or sub-groups comprises removing the groups or sub-groups including solutions from less than a predetermined number of solutions sets.

14. The method of claim 1, further comprising calculating a score for each remaining group, based on magnitudes associated with the solutions composing the group; the direction of said at least one sound source being the direction associated with the at least one group having the highest score.

15. The method of claim 11, wherein calculating the score of the remaining group or sub-group $G'_k$ comprises calculating a contributing score $W_j(G'_k)$ for each solutions set based on the solutions of that solutions set that composes the remaining group or sub-group $G'_k$.

16. The method of claim 15, wherein the score of each remaining group or sub-group is calculated as a sum of scores corresponding to the contribution of each solutions set as follows:

$$W(G'_k) = \sum_{j=1}^{N} W_j(G'_k)$$

where:

$W(G'_k)$ is the score of the remaining group or sub-group $G'_k$;

N is the number of solutions sets j; and $W_j(G'_k)$ is the contributing score of the remaining group or sub-group $G'_k$ corresponding to the contribution of the solutions set j.

17. The method of claim 15, wherein the contributing score $W_j(G'_k)$ corresponding to the contribution of each solutions set is calculated as follows:

$$W_j(G'_k) = \frac{\max(m(S_{ji} \in G'_k)) - \min(m)}{\max(m(S_{ji})) - \min(m)}$$

where:

min(m) represents the minimum of a magnitude function m associating directions with respective magnitudes;

$m(S_{ji})$ is the magnitude associated with the $i^{th}$ solution of the solutions set j; and $m(S_{ji} \epsilon G'_k)$ is the magnitude associated with the $i^{th}$ solution of the solutions set j, comprised in the group or sub-group $G'_k$.

18. The method of claim 15, wherein the contributing score corresponding to the contribution of each solutions set is calculated as follows:

$$W_j(G'_k) = \alpha_j = \frac{\max(m(S_{ji} \in G'_k)) - \min(m)}{\max(m(S_{ji})) - \min(m)}$$

where:

$\alpha_j$ is a coefficient depending on the solutions set j;

min(m) represents the minimum of a magnitude function m associating directions with respective magnitudes;

$m(S_{ji})$ is the magnitude associated with the $i^{th}$ solution of the solutions set j; and $m(S_{ji} \epsilon G_k)$ is the magnitude associated with the $i^{th}$ solution of the solutions set j, comprised in the group or sub-group $G'_k$.

19. The method of claim 18, wherein said coefficient $\alpha_j$ depends on the sound environmental conditions.

20. The method of claim 15, wherein the contributing score corresponding to the contribution of each solutions set is calculated as follows:

$$W_j(G'_k) = \frac{\max(m(S_{ji} \in G'_k)) - \min(m)}{\max(m(S_{ji})) - \min(m)} * f(d_j^{max})$$

where:

min(m) represents the minimum of a magnitude function m associating directions with respective magnitudes;

$m(S_{ji})$ is the magnitude associated with the $i^{th}$ solution of the solutions set j;

$m(S_{ji} E G'_k)$ is the magnitude associated with the $i^{th}$ solution of the solutions set j, comprised in the group or sub-group $G'_k$;

$f$ is a decreasing function; and $d_j^{max}$ is a distance, in an angular spectrum, between a point corresponding to the solution $S_{ji}$ verifying max $(m(S_{ji}\epsilon G'_k))$ and a reference point associated with the group or sub-group $G'_k$.

21. The method of claim 1, wherein the direction associated with a remaining group is calculated as a barycenter of the sound direction candidates of the solutions composing the remaining group.

22. The method of claim 21, wherein said barycenter is calculated with weights corresponding to magnitudes associated with said sound direction candidates.

23. The method of claim 1, wherein the direction associated with a remaining group is calculated as a barycenter of means of the sound direction candidates from each solutions set composing the remaining group.

24. The method of claim 1, further comprising applying another sound source localization method to the remaining groups to obtain the direction of the at least one sound source.

25. The method of claim 1, wherein the sound source localization method or methods used to obtain the solutions sets are chosen depending on the sound environmental conditions.

26. The method of claim 1, wherein said grouping comprises iteratively performing the following steps:

selecting a solution from the remaining solutions to start a new group; and adding to said new group a solution from the other remaining solutions that is close enough to a solution of the new group given a distance criterion, until no other solution of the other remaining solutions meets the distance criterion.

27. A device for determining a direction of at least one sound source from an array of microphones, comprising:
- means for obtaining a plurality of solutions sets from audio signals acquired from the microphones array, each solutions set being obtained by applying a sound source localization method to the audio signals, each solution defining a sound direction candidate;
- means for grouping said solutions into groups of solutions;
- means for removing at least one of said groups based on a criterion of disparity between the solutions sets; and
- means for obtaining the direction of said at least one sound source from directions associated with the remaining groups.

28. A non-transitory computer-readable medium storing a program which, when executed by a microprocessor or computer system in a device, causes said device to perform a method of determining a direction of at least one sound source from an array of microphones, the method comprising:
- obtaining a plurality of solutions sets from audio signals acquired from the microphones array, each solutions set being obtained by applying a sound source localization method to the audio signals, each solution defining a sound direction candidate;
- grouping the solutions of the plurality of sets into groups of solutions;
- removing at least one of said groups based on a criterion of disparity between the solutions sets; and
- obtaining the direction of said at least one sound source from directions associated with the remaining groups.

* * * * *